Oct. 23, 1962      E. R. BUXTON      3,059,880

TERMINAL PREDICTION AIRCRAFT LANDING SYSTEM

Filed June 10, 1960      4 Sheets-Sheet 1

INVENTOR.
ELLIOTT R. BUXTON
BY
AGENT

Oct. 23, 1962     E. R. BUXTON     3,059,880
TERMINAL PREDICTION AIRCRAFT LANDING SYSTEM
Filed June 10, 1960     4 Sheets-Sheet 2

INVENTOR.
ELLIOTT R. BUXTON
BY Edward A. Sokolski
AGENT

INVENTOR.
ELLIOTT R. BUXTON
BY Edward A. Sokolski
AGENT

United States Patent Office 3,059,880
Patented Oct. 23, 1962

3,059,880
TERMINAL PREDICTION AIRCRAFT LANDING SYSTEM
Elliott R. Buxton, Downey, Calif., assignor to North American Aviation, Inc.
Filed June 10, 1960, Ser. No. 35,306
17 Claims. (Cl. 244—77)

This invention relates to a terminal prediction aircraft landing system and more particularly to such a system in which a minimum amount of control action is utilized to bring an aircraft to touchdown.

Landing systems which will enable a landing in conditions of poor or zero visibility are greatly in demand both commercially and by the military as a means for increasing the reliability and safety of air travel. Most of the systems now in use utilize a predetermined or programmed path as related to either distance or time as a reference. Any deviation of the controlled aircraft from the reference path is detected in these systems by suitable instrumentation and computing logic equipment, and the information derived therefrom is fed into an autopilot to cause the aircraft to return as quickly as possible to the programmed path. If a disturbance such as, for example, an air gust should cause the vehicle to be forced from the predetermined path, appropriate signals are generated to produce automatic control action to return the aircraft to the programmed path as expeditiously as possible. This type of maneuver is objectionable on at least two grounds: (1) the continuous return to path control action tends to require more control activity than is necessary or desirable to achieve a good landing, and (2) the resulting maneuvers near the ground are not similar to a normal pilot controlled landing and can be objectionable to passengers as well as to a pilot monitoring the controls.

The device of this invention eliminates these shortcomings by generating only the necessary control action, such action being similar to that which would be utilized by a pilot to bring the aircraft to touchdown. Rather than utilizing a predetermined or programmed path and constantly returning to this path, a new path to reach the desired touchdown is derived on each occasion that an unexpected deviation occurs.

The underlying principle of operation of applicant's device is based on the theory of differential equations, which holds that the future state of a system is given completely by the solution of the differential equations defining system motion. This solution in theory is always obtainable providing all of the initial conditions defining the system are known and providing knowledge exists as to the behavior of any forcing influence, such as, for example, control surface motion on the aircraft. In applicant's device, the initial conditions for the aircraft equations of motion which are measured include the instantaneous altitude and the instantaneous change of altitude or descent rate. These two parameters are appropriately measured by an altitude sensor and an altitude rate sensor. The outputs of these sensors are fed to appropriate altitude and altitude rate computers into which the motion equations indicating the response of the particular aircraft over the flare interval have been preset. Information is also preset into the altitude and altitude rate computers as to the desired altitude (zero) and altitude rate (for example, minus 2 feet/second) at touchdown. With this information, the computers can respectively compute the altitude and the altitude rate errors at touchdown or deviations from the desired values at touchdown if no control action were to be taken. From the computer derived error information, the necessary control action to eliminate the error is determined by further computation, and this information is utilized to generate the control signal.

The control signal is fed to the aircraft control device which may, for example, be an autopilot, to effect the desired control action. It is to be noted that in applicant's device no reference or predetermined landing path is utilized but rather the knowledge of initial altitude, initial descent conditions, the response of the aircraft, and the desired touchdown conditions are utilized to solve the landing problem. In this manner, applicant's device performs no more control action than is absolutely necessary to effect a good landing, such control action being similar to that which would be utilized by a pilot.

It is therefore an object of this invention to provide an improved landing system.

It is a further object of this invention to provide a landing system in which minimum control action is utilized, such control action being similar to pilot control.

It is a still further object of this invention to improve the automatic landing of an aircraft.

It is still another object of this invention to provide an automatic landing system readily adaptable for universal use in all types of aircraft.

It is still a further object of this invention to provide a simple yet effective automatic landing system in which the landing flare information is computed wholly within the aircraft.

It is another object of this invention to provide an improved landing system in which the theory of differential equations is utilized to effect a landing.

Other objects of this invention will become apparent from the following description as read in connection with the accompanying drawings in which FIG. 1 is a block diagram illustrating the basic operation of the device of the invention;

FIG. 3 is a functional block diagram illustrating the operation of a preferred embodiment of the device of the invention;

Figure 2:
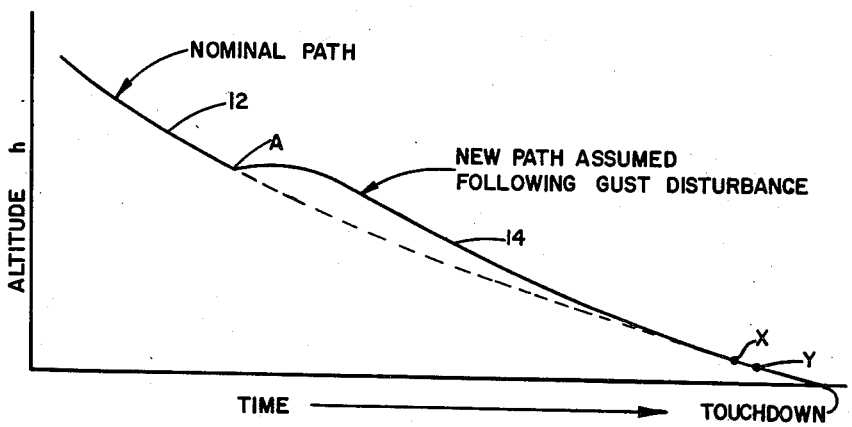
FIG. 2 is a diagram illustrating how a typical landing may be effected utilizing the device of the invention.

Referring to FIG. 2, a typical landing path which might be effected using the device of this invention is illustrated. The path followed by the aircraft is plotted as a function of aircraft altitude versus time. In the preferred embodiment of the invention a predetermined time, for example, 20 seconds is utilized to effect the landing. Plot line 12 (including the dotted extension thereof) illustrates the nominal path that would be followed by the aircraft, in the absence of any disturbances, in effecting such a landing in the predetermined time. As can be seen, if the nominal path is followed, a touchdown will be effected passing through points X and Y near touchdown as indicated. If, however, a disturbance should be experienced at point A which would cause the aircraft to deviate from the nominal path, as indicated, a new landing path 14 will be assumed. It is to be noted that this path will take the shortest approach to the touchdown point commensurate with a safe landing. This path will pass through the same two points X and Y near touchdown. It is to be noted that the path 14 closely resembles the path that a pilot would follow in the event of a gust disturbance at A.

The device of this invention may be termed a two-condition terminal prediction landing system, i.e., there are two conditions which the control system simultaneously seeks to achieve. These include (1) the bringing of altitude to zero and (2) bringing the altitude rate to a predetermined negative value, for example, minus 2 feet per second in a predetermined time interval. To provide for a smooth landing, control action is minimized.

Figure 1:
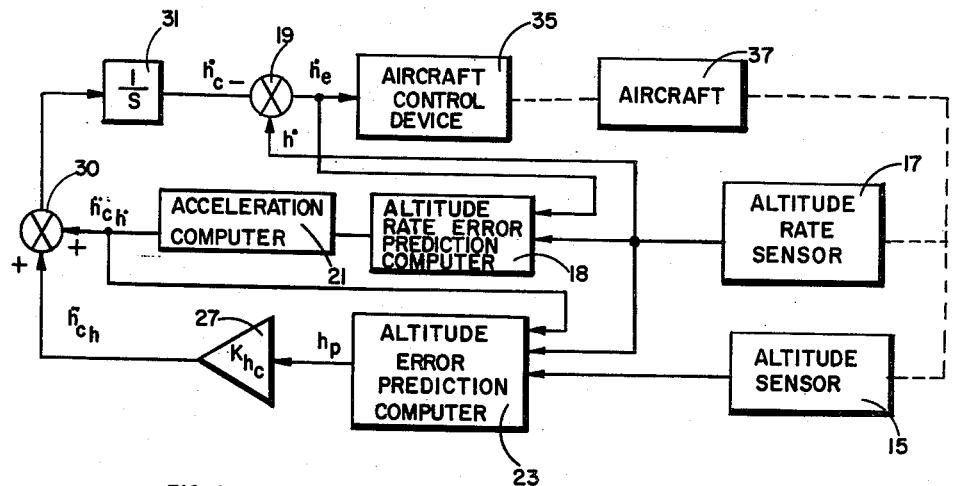

Referring to FIG. 1, the basic operation of the device of the invention is illustrated. An altitude sensor 15, which may, for example, be a radar altimeter, and an altitude rate sensor 17, which may be, for example, a linear velocity meter mounted on a stable platform so that it is not subjected to angular input signals, are mounted in the aircraft. The output of altitude rate sensor 17 which represents the actual descent rate of the aircraft is fed to altitude rate error prediction computer 18. The output of summing device 19, which is a signal representing the difference between the actual rate of descent and the desired rate of descent for a proper landing which is the altitude rate error, $\dot{h}_e$, is fed as a feedback signal to the altitude rate error prediction computer 18. The altitude rate error prediction computer 18 computes the instantaneous contribution to predicted altitude rate error at touchdown, $\dot{h}_p$, assuming of course that no future control action is taken. This touchdown altitude rate error signal $\dot{h}_p$ represents the difference between the desired altitude rate at touchdown which may, for example, be minus 2 feet per second, and the instantaneous predicted touchdown altitude rate, assuming no future control action is taken.

Th output $\dot{h}_p$ of the altitude rate error prediction computer 18 is fed to acceleration computer 21. Acceleration computer 21 computes the change in the aircraft's descent rate or acceleration command, $\ddot{h}_{c_h}$, necessary to reduce the predicted altitude rate error at touchdown $\dot{h}_p$ to zero, i.e., to achieve the desired altitude rate at the predetermined touchdown time. The outputs of altitude sensor 15, of altitude rate sensor 17, and of acceleration computer 21 are all fed to altitude error prediction computer 23. Utilizing these inputs, altitude error prediction computer 23 computes the instantaneous contribution to altitude error at touchdown, $h_p$, assuming no control action is taken. This, of course, would be any predicted altitude $h_p$ other than zero the desired touchdown altitude. The output $h_p$ of altitude error prediction computer 23 is fed to amplifier 27 where it is multiplied by a predetermined constant $K_{h_c}$. The exact factor by which the predicted altitude error signal is multiplied in amplifier 27 is not critical as long as the output of amplifier 27, which may be represented as the acceleration or deceleration necessary to reach zero altitude at the desired time, is not so large as to cause unnecessarily abrupt correction or so small as to be incapable of causing the required corrective action in the time remaining to touchdown. The outputs of amplifiers 27 and acceleration computer 21 are fed to summing device 30 where they are added together and fed to integrator 31. The output of integrator 31 is the altitude rate command signal, $\dot{h}_c$, which the aircraft must follow in order to arrive at touchdown with the desired altitude (zero) and altitude rate (for example, minus 2 feet/second). The altitude rate command signal $\dot{h}_c$ is compared in comparator 19 with the actual aircraft descent rate $\dot{h}$ as obtained from altitude rate sensor 17. The output of comparator 19 is the altitude rate error $\dot{h}_e$ which represents the difference between $\dot{h}_c$ and $\dot{h}$ or the amount by which the actual altitude rate must be changed in response to the altitude rate command signal, $\dot{h}_c$, to achieve the desired altitude rate.

The output, $\dot{h}_e$ of comparator 19 is fed to aircraft control device 35. By means of aircraft control device 35 necessary control action is effected on the aircraft 37 to bring the descent rate to the desired value. Aircraft control device 35 may be an autopilot or may be an indicator pictorially representing the error signal, the pilot flying the aircraft, to bring this error signal to zero. The details of the functioning of the various components, such as the altitude rate error prediction computer 18, the altitude error prediction computer 23, and the acceleration computer 21, will be explained further on in the specification.

It is to be noted with reference to FIG. 1 that altitude rate error prediction computer 18, altitude error prediction computer 23, amplifier 27, acceleration computer 21 and summing device 30 in effect comprise means responsive to sensed altitude and altitude rate for computing an acceleration required to achieve a selected altitude and altitude rate at a predetermined time. Integrator 31 and comparator 19 comprise means responsive tothe acceleration so computed for deriving a landing control signal.

Several significant features of applicant's invention may be noted with reference to the description of applicant's device taken in connection with FIG. 1. These include first, the use of a constant gain altitude rate feedback term (from the output of altitude rate sensor 17 to comparator 19). By presetting this fixed altitude rate feedback gain to the proper value for each aircraft-autopilot combination, essentially identical altitude rate response is obtained for most normal autopilot controlled aircraft. With this one adjustment properly made for each aircraft-autopilot combination, the other necessary adjustments to the system for a particular design will be the same in almost all instances. Secondly, the generation of command signals $\ddot{h}_{c_h}$ and $\ddot{h}_{c_h}$ as inputs to integrator 31, the output of which is an altitude rate command signal $\dot{h}_c$, yields a flare-out action more similar to a manually controlled flare, and makes possible the achievement of a flare utilizing minimum control system action. The output of integrator 31 reflects the sum of the contributions of all of the instantaneous touchdown altitude error and altitude rate error predictions. The use of integration at this point makes the overall system basically second order, thereby allowing a curved flight path intercepting the touchdown point at a proper design rate to be most effectively achieved. Thirdly, the computed altitude rate used as a command signal is derived from only three variables, the current altitude, the current altitude rate, and the current altitude rate error, $\dot{h}_e$. The use of only three measured variables in applicant's system greatly contributes to its simplicity.

Referring now to FIG. 3, a functional block diagram illustrating a preferred embodiment of the device of the invention is shown. In the embodiment illustrated a predetermined flare control period for effecting a landing is utilized. A typical such flare control period which may be utilized is 20 seconds. It is assumed that a suitable auxiliary control system has brought the aircraft into the vicinity of the runway and into an orientation so that a flare is physically realizable. GCA and ILS systems typify such auxiliary methods. The commencement of the predetermined time interval T for effecting the landing flare (assumed for illustrative purposes to be approximately 20 seconds) may be determined for most aircraft as occurring at an altitude equal to seven times the aircraft descent rate.

Assuming a relatively constant descent rate in the approach, the landing flare should be commenced when the altitude is equal to seven times this descent rate as either determined by the pilot or by an automatic comparison of these two parameters for the predetermined desired relationship. Such an automatic comparison may be made by feeding the outputs of the altitude and altitude rate sensors to a conventional electronic comparator circuit such as, for example, a Schmitt trigger which will produce a "flare" relay keying signal when the desired relationship between these signals exists. At any rate, at the time for commencement of the flare control period, switches 40 and 41 are thrown either manually or automatically from the "pre-flare" position to the "flare" position. Prior to flare initiation, switch 41 in its pre-flare position closes a negative feedback loop to integrator 31 and thereby assures zero output from this integrator at the initiation of flare. Switch 40, at flare initiation, connects power source 43 to time drive motor 45. Connected to the output shaft 47 of time drive motor 45 is the control arm of each of function generators 49, 50, 51, 53 and acceleration computer 21 which may also be a function generator. These function generators may, for example, be specially wound tapped potentiometers such as described in section 6.10 (page 321 et seq.) of Electronic Analog Computers by Korn & Korn, published by McGraw-Hill Company in 1956. The details of the characteristics of each of these function generators will be explained further on in the specification in connection with FIG. 4. Time drive motor 45 has a shaft 47 which turns at a constant speed and drives each of the control shafts of the function generators 49, 50, 51, 53, and 21 at a constant rate throughout the flare control period.

Figure 4A:
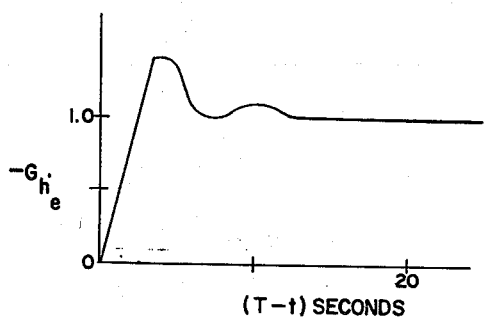
FIG. 4 is a series of sketches illustrating the characteristics of typical function generators which may be utilized with the embodiment illustrated in FIG. 3.

The output, $\dot{h}_e$ of comparator device 19 which represents the altitude rate error, or the amount by which the aircraft's altitude rate must be corrected to attain the desired altitude rate at touchdown, is fed as an input to function generator 53. Function generator 53 may be a potentiometer wound in such a way that the resistance at its arm as this arm is turned represents the effective response of the aircraft as combined with its control system to altitude rate error signals at any time during the time interval, T from the commencement of the landing flare to touchdown. This response may be determined experimentally, for example, by analogue computer studies. The resistance at the arm of the potentiometer should vary in such a way over the time period T so as to account for changes in the effective response of the aircraft and its control system as combined to the altitude rate error signal. In this manner, changes in the effect of any particular altitude rate error signal on the altitude rate which can be expected at touchdown are accounted for or weighted in the computation of predicted altitude rate error. Basically, then, function generator 53 gives to the altitude rate error signal a weight or significance as a function of time in accordance with the changing effect that a unit altitude rate error would have on the altitude rate at touchdown. A typical response characteristic for function generator 53 which might be obtained by an analysis of a particular aircraft-control system combination is illustrated in FIG. 4a. Here it can be seen that the response characteristic is such as to call for unity output of the function generator for the first approximately 8 seconds of the landing flare and a changing response during the remaining period of the flare. During the last few seconds before touchdown, the effective gain is rapidly brought to zero to avoid the feeding into the system of rapidly changing altitude rate error signals close to touchdown which might undesirably affect the touchdown. In effect, therefore, function generator 53 modifies the altitude rate error signal as a function of the response with altitude rate feedback of the combined aircraft-control system versus time. The output of function generator 53 which is the product of current altitude rate error ($\dot{h}_e$) and the instantaneous altitude rate error response as a function of the time remaining to touchdown ($-G_{\dot{h}_e}[T-t]$) is fed to summing device 55. A signal indicative of current altitude rate ($\dot{h}$) from altitude rate sensor 17 is also fed to summing device 55 as well as the output of touchdown altitude rate reference source 57 which represents the desired altitude rate at touchdown (for example, minus 2 feet/second). The output of summing device 55 is the instantaneous predicted altitude rate error at touchdown which may be designated $\dot{h}_p$. This may be expressed mathematically as follows:

$$\dot{h} = \dot{h} + \dot{h}_e(-G_{\dot{h}_e})[T-t] - \dot{h}_{ref} \quad (1)$$

where
$\dot{h}$ = altitude rate;
$\dot{h}_e$ = autitude rate error;
$(-G_{\dot{h}_e})[T-t]$ = the weighting factor presented by function generator 53 as a function of time to go to touchdown; and
$\dot{h}_{ref}$ = the output of reference source 57 representing desired touchdown altitude rate.

Figure 4B:
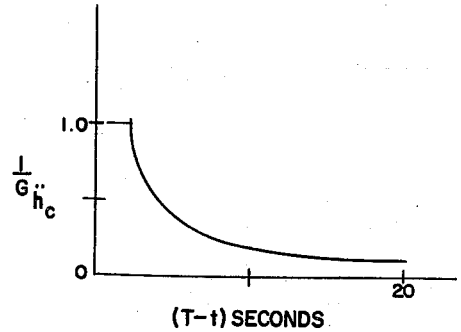

The output of summing device 55, $\dot{h}_p$, is fed to function generator 21 which serves as an acceleration computer. Function generator 21 may be a potentiometer wound so that the resistance at its movable arm represents the reciprocal of system altitude rate response versus time to a unit acceleration command. By multiplying the predicted touchdown altitude rate error, $\dot{h}_p$, by the reciprocal of the altitude rate response of the system as indicated as a function of the time remaining to touchdown at the arm of function generator 21, the command signal (in terms of acceleration, $\ddot{h}_{ci}$) which will bring about the desired altitude rate at touchdown is determined. A typical response characteristic for function generator 21 as related to time as derived for the same system as that of FIG. 4a is indicated in FIG. 4b. As can be seen, as the time to go decreases, the amplitude of the command signal must of necessity increase for a given predicted rate error to reduce this error to zero in the time remaining. Theoretically, the command signal would rise rapidly as we approach zero time. However, obviously undesirable effects of such control action are eliminated by cutting the effect of the function generator on the command signal to a fixed value approximately a second prior to zero time. The output of function generator 21 is fed to summing device 30.

Figure 4C:
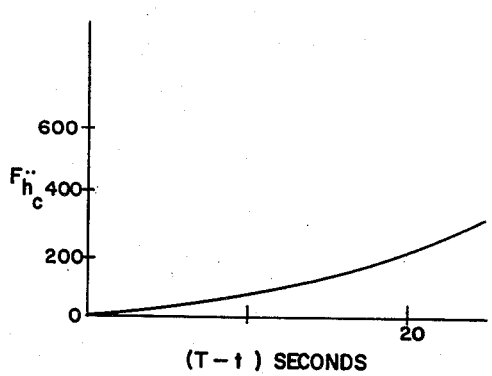

With no further feedback loops closed, this system would always choose a constant acceleration path which achieved the desired altitude rate at touchdown. However, the aircraft must achieve this altitude rate when the aircraft reaches the ground, so an outer loop is required to bring about this constraint. This outer loop includes function generators 51, 50, and 49, and summing device 60, and comprises the altitude error prediction computed 23. The predicted altitude error at touchdown, $h_p$, is derived similarly to the predicted altitude rate error $\dot{h}_p$. Due to the obvious effects on altitude of any control action to achieve the desired altitude rate, the output of function generator 21 which affects the altitude rate command signal is fed to function generator 51 to contribute to the computation of predicted altitude error. Function generator 51, typical characteristics for which are illustrated in FIG. 4c, is wound to represent the system altitude response to a step acceleration command versus time, i.e., it represents the changing effect on the predicted terminal altitude of an acceleration command during the time interval of the flare. The output of function generator 51 is fed to summing device 60.

Figure 4D:
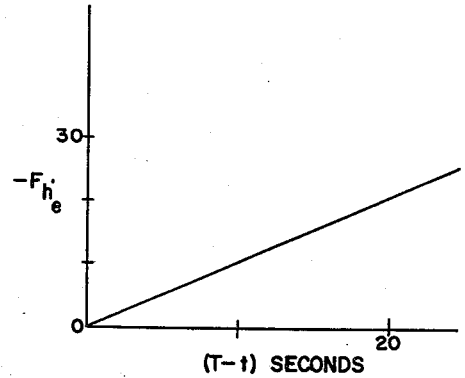
Figure 4E:
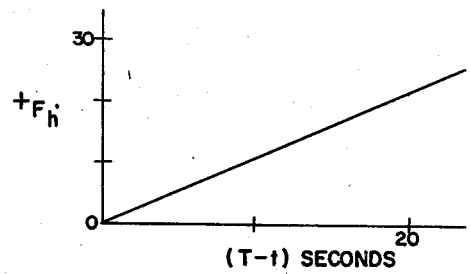
Figure 5:
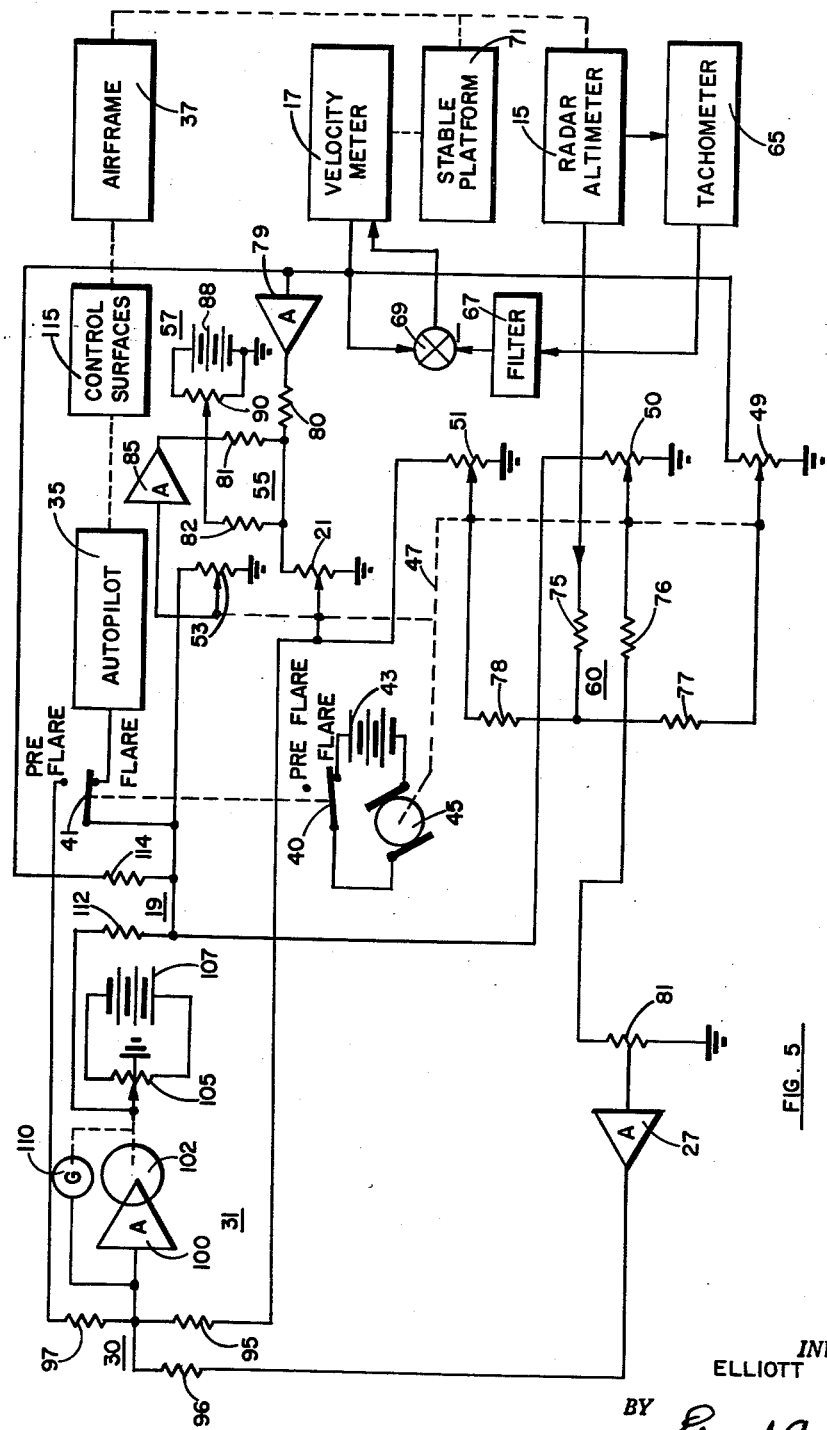

The altitude rate error signal $\dot{h}_e$ is fed from differencing means 19 to function generator 50. Function generator 50 is wound to represent the system altitude response to altitude rate error versus time, i.e., it accounts for changes in the effect that a unit altitude rate error signal would have on the predicted terminal altitude with time. Typically derived characteristics for function generator 50 are shown in FIG. 4d. The output of function generator 50 is fed to summing device 60. Function generator 49 is wound to represent the system altitude response to altitude rate signals versus time, i.e., it accounts for the changing effect that a unit altitude rate signal would have in the prediction of the final altitude (at touchdown) during the time interval of the flare. Typical characteristics for function generator 49 are illustrated in FIG. 4e. The output of altitude rate sensor 17 is fed to function generator 49. The output of function generator 49 is fed to summing device 60. The output of altitude sensor 15 is also fed to summing device 60.

The output of summing device 60 is the instaneous predicted altitude error at touchdown, $h_p$. The mathematical expression for $h_p$ which represents the computation accomplished in the altitude loop is as follows:

$$h_p = h + \ddot{h}_{ci}(F_{\ddot{h}_c})[T-t]$$
$$+ \dot{h}_e(-F_{\dot{h}_e})[T-t] + \dot{h}(F_{\dot{h}})[T-t] \quad (2)$$

where $h$ = current or instantaneous altitude;
$\dot{h}$ = current or instaneous altitude rate;
$\ddot{h}_{c_h}$ = acceleration command required to attain the desired altitude rate at touchdown;
$\dot{h}_e$ = the altitude rate error signal;
$(F_{\ddot{h}_c})[T-t]$ = the output characteristics of function generator 51 over the flare time interval which represent the system altitude response to acceleration commands during this interval;
$(-F_{\dot{h}_e})[T-t]$ = the system altitude response to altitude rate error signals during the flare time interval, the output of function generator 50; and
$(F_{\dot{h}})[T-t]$ = the system response to altitude rate signals during the flare time interval as indicated in the output of function generator 49.

The instantaneous predicted altitude error signal, $h_p$ is fed to amplifier 27 where it is multiplied by constant gain factor, $K_{h_c}$. This constant gain multiplication determines the predetermined fixed amount of control action to be taken per unit of predicted altitude error signal. The exact value of this predetermined control action in terms of an acceleration command signal is not critical but for most applications should be between minus .5 and minus 2 feet/second acceleration command for each foot of predicted altitude error. The output of amplifier 27 which may be represented as $\ddot{h}_{c_h}$, the acceleration command signal for reducing the altitude error to zero at touchdown, is fed to summing device 30 where it is added to the output $\ddot{h}_{c_{\dot{h}}}$ of the function generator 21 which represents the acceleration command for reducing the altitude rate to the desired value at touchdown.

Figure 5:
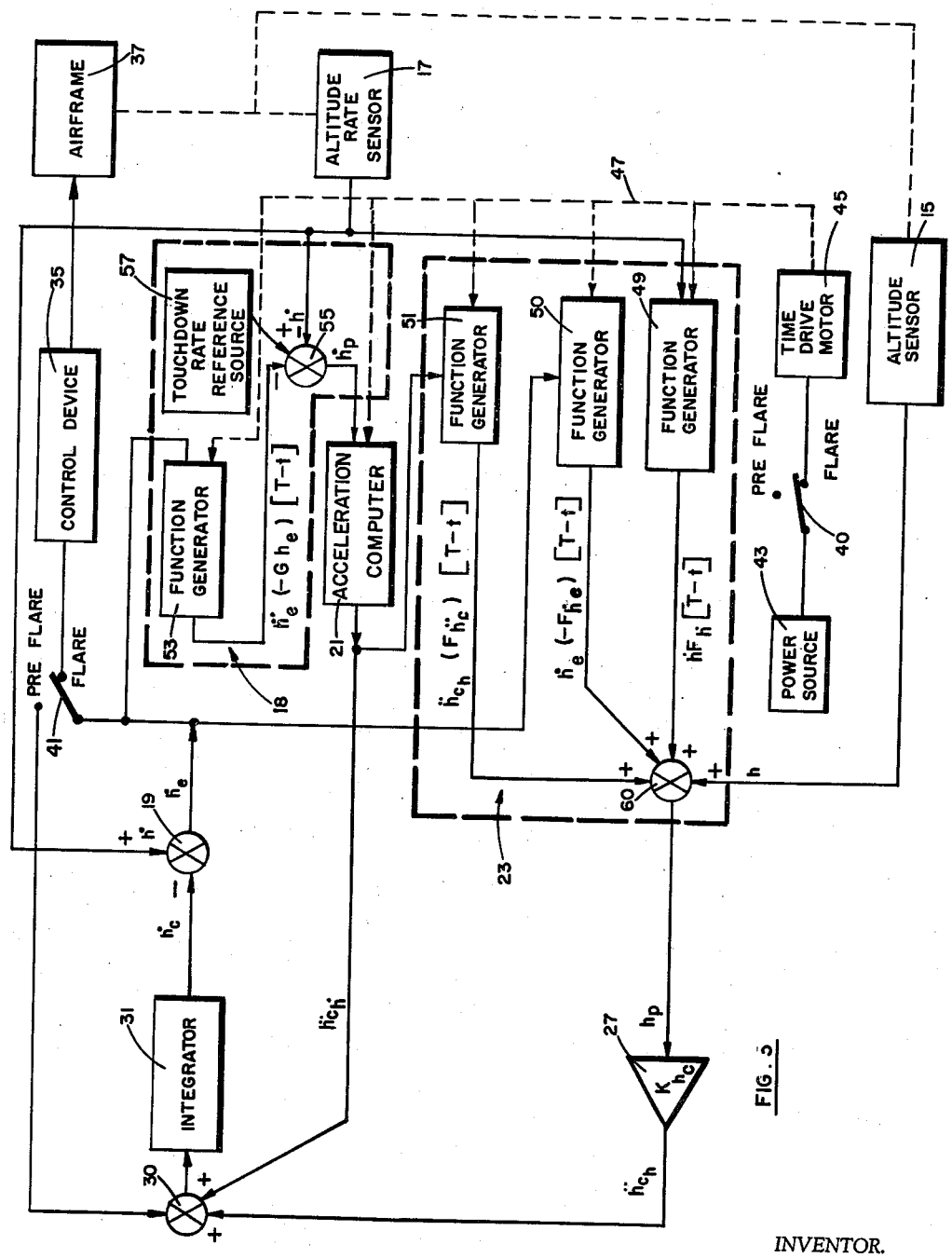
FIG. 5 is a functional schematic diagram illustrating a typical mechanization of the embodiment illustrated in FIG. 3.

The output of summing device 30 which represents the total acceleration command signal is fed to integrator 31 where appropriate integration, as to be explained in detail with reference to FIG. 5, is accomplished. The inclusion of integrator 31 which sums all the instantaneous acceleration command signals makes the overall system basically second order, thereby allowing a curved flight path intercepting the touchdown point at a proper design rate to be most effectively achieved. This greatly improves the performance of the system, making it more closely resemble pilot control.

The output, $\dot{h}_c$ of integrator 31, is fed to comparator device 19 where it is compared with the output $\dot{h}$ of altitude rate sensor 17. The difference between the command or desired altitude rate, $\dot{h}_c$, and the actual altitude rate, $\dot{h}$, is the altitude rate error, $\dot{h}_e$. This represents the altitude rate error which the system must correct for to reach the desired end results. The altitude rate error signal $\dot{h}_e$ is fed through switch 41 to control device 35 where it is utilized to correct the landing flare of the aircraft to achieve the desired touchdown conditions. Control device 35 may be an autopilot as shown in FIG. 5, or may be an indicator device by means of which the pilot may "fly" the aircraft by to effectively cancel out the error.

It is to be noted that the altitude rate or "G" weighting functions indicated in FIGS. 4a and 4b, and the altitude response or "F" weighting functions indicated in FIGS. 4c, 4d and 4e, can be derived empirically for any particular aircraft by means of an analogue computer study, as is well known in the art. These "F" and "G" weighting functions are based on such parameters as average aircraft trim, aircraft-control system response, and ground effects. While the weighting functions indicated in FIG. 4 actually are those derived for a particular aircraft, they are fairly representative of the type of weighting function which would be obtained for most high-speed aircraft in use today, and with the proper adjustment of the fixed gain altitude rate feedback term (from altitude rate sensor 17 to comparator 19) for each aircraft-control system combination, the same function generators may be universally used.

Referring now to FIG. 5, a functional schematic diagram of a typical aircraft installation of the embodiment shown in FIG. 3 is shown. In FIG. 5 like numerals are used to identify corresponding components shown in FIG. 3. The altitude signal is generated by radar altimeter 15 which may be any radar altimeter having high accuracy. An altitude signal is supplied by velocity meter 17 as supervised by a differentiated output from radar altimeter 15 as provided by means of tachometer 65. As is well known in the art, a radar altimeter altitude signal may be differentiated by feeding such an altitude signal to differentiating means, such as, for example, a tachometer, to produce an altitude rate signal. It has been found, however, that an altitude rate signal so derived has high frequency noise components, even after appropriate filtering, which impair its utility. Hence, in a high precision system, the use of a velocity meter to generate an altitude rate signal is recommended. It is necessary, however, as is well known in the art, that when a velocity meter which is an integrating accelerometer is used, that an initial rate of descent signal be provided to assure that the integrating accelerometer integrates from a proper given condition. To provide this information, the output of tachometer 65 is filtered by means of high frequency filter 67 and fed to comparator device 69 where it is compared with the output of velocity meter 17. The difference signal is then fed as a supervisory signal to velocity meter 17 to provide a supervisory correction signal to the velocity meter to modify its output in accordance with the differentiated altitude signal generated by means of radar altimeter 15 and tachometer 65.

Velocity meter 17 is mounted on a stable platform 71 stabilized for the aircraft yaw and roll axes so that the velocity meter will not be subjected to angular signals and will not have such signals reflected in its output. Any stable platform which will maintain stability on the yaw and roll axes within about ½° should be adequate. See, for example, Patent No. 2,606,448 issued August 12, 1952, C. L. Norden et al., inventors. Velocity meter 17 may be an integrating accelerometer such as, for example, described in Patent No. 2,840,366 issued June 24, 1958, W. G. Wing inventor. Another suitable device which may be readily adapted to function as a velocity meter for this purpose is described in co-pending application Serial No. 858,523, inventors Doyle E. Wilcox et al., filed December 9, 1959 and assigned to North American Aviation, Inc., the assignee of this case.

Each of function generators 49, 50, 51, 21, and 53 are potentiometers wound to represent the particular predetermined functions described in connection with FIGS. 3 and 4. The arms of these potentiometers are mechanically coupled to the output shaft 47 of motor 45 so that they are driven in accordance therewith. The output shaft 47 of motor 45 will commence to rotate when power is supplied to motor 45 with the throwing of switch 40 from the preflare to the flare position with the commencement of the landing flare. Switch 40 may be either thrown manually or it may be actuated by automatic means, as already indicated, when the time for flare initiation (at approximately 20 seconds to touchdown) is reached. At this time, power will be supplied from power source 43 to drive motor 45 continuously in one direction at a steady rate. The outputs of radar altimeter 15 and function generators 49, 50 and 51 are summed in summing device 60 which comprises summing resistors 75, 76, 77, and 78. These summed signals are fed through voltage divider 81 to amplifier 27. Resistor 81 may be the input resistor to amplifier 47 and provides a fixed gain factor in the output of this amplifier.

The output of velocity meter 17 is fed to amplifier 79 where it is appropriately amplified. The output of amplifier 79 is fed to summing resistor 80 in summing device 55. The output at the arm of function generator 53 is appropriately amplified in amplifier 85, the output of amplifier 85 being fed to summing resistor 81 in summing device 55. A touchdown altitude rate reference signal is generated by touchdown altitude rate reference source 57 which comprises D.-C. source 88 and tapped resistor 90. A predetermined fixed direct-current signal is developed at the tap of resistor 90 which represents the desired altitude rate at touchdown. This signal is fed to summing resistor 82 in summing device 55.

The summed output of summing device 55 is fed to one end of function generating potentiometer 21, the other end of this potentiometer being grounded. The signal at the arm of function generator 21, which, as already explained, represents an acceleration command signal, $\ddot{h}_{c_h}$ is fed both to the top end of function generator 51 and to resistor 95 in summing device 30. The output of amplifier 27, which represents an acceleration command signal generated in response to a predicted altitude error, $\ddot{h}_{c_h}$ is fed to summing resistor 96 in summing device 30. The output of summing device 30 is fed to servo-amplifier 100 which in turn drives servo-motor 102. The output shaft of servo-motor 102 is coupled to the movable arm of potentiometer 105 which has a grounded center tap. A D.-C. power source 107 is connected across the ends of potentiometer 105. Hence, the signal appearing at the arm of potentiometer 105 will be a positive or negative D.-C. voltage representing the algebraic sum of the rotation of the output shaft of servo-motor 102. This signal thus represents an integration of the input command signals fed to servo-amplifier 100. A rate feedback signal is provided from the output shaft of servo-motor 102 to the input of amplifier 100 by means of tachometer 110. The use of such a rate feedback signal, as is well known in the art, will help to make the output of the servo amplifier-motor combination more precisely in response to its input. Integrator 31 comprises amplifier 100, servomotor 102, tachometer 110, potentiometer 105, and D.-C. voltage source 107.

The output at the arm of potentiometer 105 which represents the integrated acceleration command signal or the altitude rate command signal is fed to summing resistor 112 in comparator device 19. The output of velocity meter 17 which represents instantaneous altitude rate is fed to summing resistor 114 in comparator device 19. The output of comparator 19, which is the difference between the altitude rate command signal and the actual instantaneous altitude rate, is fed as an altitude rate error signal through switch 41 to autopilot 35. This error signal is utilized to control the autopilot in such a manner as to tend to make the actual altitude rate coincide with the altitude rate command signal and thereby cancel out the error signal. The autopilot output is used to control the appropriate control surfaces 115 to accomplish this desired end result.

Prior to the initiation of the flare, with the simultaneous throwing of switches 41 and 40 from the preflare to the flare position, either manually or automatically, switch 41 is in its preflare position and connects the output of comparator 19 to summing resistor 97 in summing device 30. This effectively provides a negative feedback signal to the input of the servo amplifier-motor combination 100 and 102 to keep the output of servo-motor 102 at the zero or grounded position, thereby assuring that it is at this zero position with the commencement of the desired integration at the start of the flare landing.

The device of the invention thus provides a simple yet effective means for controlling an aircraft landing flare with the absolute minimum control system action required to accomplish this end result. The system performs similarly to the control action which a human operator would follow, making it conducive to a smooth comfortable landing readily acceptable to both pilots and passengers.

Although this invention has been described and illustrated in detail, it is to be clearly understood that the same is by way of illustration and example only and is not to be taken by way of limitation, the spirit and scope of this invention being limited only by the terms of the appended claim.

I claim:

1. A landing system comprising means responsive to sensed altitude and altitude rate for computing an acceleration required to achieve a selected altitude and altitude rate at a predetermined time, and means responsive to said computed acceleration and sensed altitude rate for deriving a landing control signal.

2. A system for landing an aircraft comprising means responsive to the instantaneous altitude rate of said aircraft for computing the aircraft acceleration necessary to achieve a predetermined desired altitude rate at a predetermined future time, means responsive to the instantaneous altitude and altitude rate of said aircraft for computing an aircraft acceleration necessary to reduce altitude to zero at said predetermined time, means for integrating the outputs of said acceleration computing means, and means responsive to the output of said integrating means for controlling the descent of said aircraft.

3. The device as described in claim 2 wherein said integrating means comprises a servo-amplifier driven in response to the outputs of said acceleration computing means, a servo-motor driven by the output of said servo-amplifier, and a potentiometer, the arm of said potentiometer being driven by the output of said servo-motor.

4. A system for landing an aircraft in a predetermined time interval comprising means responsive to the instantaneous altitude rate of said aircraft for predicting altitude rate of the end of said predetermined time interval, means responsive to the instantaneous altitude and instantaneous altitude rate of said aircraft for predicting altitude at the end of said predetermined time interval, means responsive to the output of said altitude rate computing means for computing the aircraft acceleration necessary to achieve a predetermined desired altitude rate at the end of said predetermined time interval, means responsive to the output of said altitude computing means for computing an aircraft acceleration necessary to reduce altitude to zero at the end of said predetermined time interval, means for summing the outputs of both said acceleration computing means, means for integrating the output of said summing means, and means responsive to the output of said integrating means for controlling the descent of said aircraft.

5. The device as recited in claim 4 wherein said means for predicting altitude and altitude rate comprises a plurality of function generators, the output of each of said generators representing a predetermined response of said aircraft as combined with its associated control system during said predetermined time interval.

6. A system for landing an aircraft in a predetermined time interval comprising an altitude sensor, an altitude rate sensor, means responsive to the output of said altitude rate sensor for computing the aircraft acceleration necessary to achieve a predetermined desired altitude rate at the end of said predetermined time interval, means responsive to the outputs of said altitude and altitude rate sensors for computing an aircraft acceleration necessary to reduce altitude to zero at the end of said predetermined time interval, means for summing the outputs of both said acceleration computing means, means for integrating the output of said summing means, comparator means for deriving a signal indicative of the difference between the output of said integrator and the output of said altitude rate sensor, and means responsive to the output of said comparator means for controlling the descent of said aircraft.

7. The device as decited in claim 6 wherein said means for computing aircraft acceleration necessary to achieve a predetermined altitude rate comprises a plurality of function generators, the output of each of said function generators representing a predetermined response of said aircraft as combined with its associated control system during said predetermined time interval.

8. In a system for landing an aircraft in a predetermined time interval, an altitude sensor mounted on said aircraft, an altitude rate sensor mounted on said aircraft, an altitude rate error prediction computer, an altitude error prediction computer, the output of said altitude rate sensor being fed to said altitude rate error computer, the outputs of both said altitude sensor and said altitude rate sensor being fed to said altitude error computer, an acceleration computer connected to receive the output of said altitude rate error computer, a summing device responsive to the outputs of said acceleration computer and said altitude error predictor, an integrator, the output of said summing device being fed to said integrator, comparator means connected to receive the outputs of said integrator and said altitude rate sensor for deriving an error signal indicative of the difference therebetween, and an aircraft control device, the output of said comparator means being fed to said aircraft control device and to said altitude rate error computer.

9. In a system for landing an aircraft in a predetermined time interval, an altitude sensor mounted on said aircraft, an altitude rate sensor mounted on said aircraft, scaling means responsive to the outputs of said altitude sensor and said altitude rate sensor for deriving a signal indicative of an aircraft acceleration for bringing said aircraft to touchdown in said predetermined time interval, computer means responsive to the output of said altitude rate sensor for computing aircraft acceleration necessary to bring said aircraft to a predetermined altitude rate in said predetermined time interval, means for summing the outputs of said computer means and said scaling means, an integrator, the output of said summing means being fed to said integrator, means for comparing the output of said integrator and the output of said altitude rate sensor and deriving an error signal indicative of the difference therebetween, and an aircraft control device, the output of said comparator being fed to said aircraft control device.

10. In a system for landing an aircraft in a predetermined time interval, an altitude sensor mounted on said aircraft, an altitude rate sensor mounted on said aircraft, an altitude error prediction computer, an altitude rate error prediction computer the output of said altitude rate sensor being fed to said altitude rate error computer, the outputs of both said altitude sensor and said altitude rate sensor being fed to said altitude error computer, scaling means responsive to the output of said altitude error computer for deriving a signal indicative of an aircraft acceleration which will bring said aircraft to touchdown in the predetermined time interval, an acceleration computer connected to receive the output of said altitude rate error computer, means for summing the outputs of said acceleration computer and said scaling means, an integrator, the output of said summing means being fed to said integrator, means for comparing the output of said integrator and the output of said altitude rate sensor and deriving an error signal indicative of the difference therebetween, and an aircraft control device, the output of said comparing means being fed to said aircraft control device, the output of said comparing means further being fed to said altitude rate error prediction computer, the output of said acceleration computer being fed to said altitude error prediction computer.

11. A terminal prediction system for landing an aircraft in a predetermined time interval comprising an altitude sensor, an altitude rate sensor, means responsive to said altitude sensor for generating a signal indicative of predicted altitude rate error at touchdown, means responsive to said altitude rate sensor and said altitude sensor for generating a signal indicative of predicted altitude error at touchdown, means responsive to said altitude rate error generating means for generating a signal indicative of aircraft acceleration necessary to reduce the predicted altitude rate error in said predeterminer time interval to zero, means responsive to said altitude error generating means for generating a signal indicative of aircraft acceleration necessary to reduce the predicted altitude error in said predetermined time interval to zero, means for summing the outputs of said means for generating signals indicative of acceleration, means for integrating the output of said summing means, means for comparing the outputs of said integrating means and said altitude rate sensor and deriving an error signal indicative of the difference therebetween, and aircraft control means responsive to said error signal for controlling the descent of said aircraft, said error signal further being fed to the input of said altitude rate error generating means.

12. The device as recited in claim 11 wherein said means for generating a signal indicative of predicted altitude rate error and said means for generating a signal indicative of altitude error comprise function generators having outputs respresentative of response of the aircraft and landing system as combined to the respective input signals fed to said potentiometers during said predetermined time interval.

13. The device as recited in claim 12 said signal generating means additionally comprising motive means for driving said function generators during said predetermined time interval.

14. A terminal prediction system for landing an aircraft comprising an altitude sensor mounted on said aircraft, an altitude rate sensor mounted on said aircraft, means responsive to the output of said altitude rate sensor for generating a signal indicative of predicted altitude rate error at touchdown, means responsive to the outputs of both said altitude rate and altitude sensors for generating a signal indicative of predicted altitude error at touchdown, means responsive to said altitude rate error generating means for generating a signal indicative of aircraft acceleration necessary to reduce the predicted altitude rate error at touchdown to zero, means responsive to said altitude error generating means for generating a signal indicative of aircraft acceleration necessary to reduce the predicted altitude error at touchdown to zero, means for summing the outputs of said means for generating signals indicative of acceleration, means for integrating the output of said summing means, means for comparing the outputs of said integrating means and said altitude rate sensor and deriving an error signal indicative of the difference therebetween, and aircraft control means responsive to said derived error signal for controlling the descent of said aircraft, said error signal further being fed to the input of said altitude rate error generating means, said signal indicative of aircraft acceleration necessary to reduce the altitude rate error to zero being fed to said predicted altitude error generating means.

15. The device as recited in claim 14 wherein said means for generating a signal indicative of predicted altitude rate error and said means for generating a signal indicative of predicted altitude error comprise function generator potentiometers having outputs representative of response versus time of the aircraft and landing system as combined to the respective inputs fed to said potentiometers.

16. The device as recited in claim 15 wherein said means for generating signals additionally comprises a motor connected to drive the movable arms of said potentiometers.

17. The device as recited in claim 14 wherein said integrating means comprises a servo amplifier, a servo motor driven by the output of said servo amplifier and a potentiometer, the arm of said potentiometer being driven by the output shaft of said servo-motor.

References Cited in the file of this patent

UNITED STATES PATENTS

| | | |
|---|---|---|
| 2,830,291 | Hecht | Apr. 8, 1958 |
| 2,841,345 | Halpert | July 1, 1958 |